(12) United States Patent
Yu

(10) Patent No.: US 11,640,093 B2
(45) Date of Patent: May 2, 2023

(54) ARRAY SUBSTRATE AND DISPLAY PANEL

(71) Applicant: TCL CHINA STAR OPTOELECTRONICS TECHNOLOGY CO., LTD., Guangdong (CN)

(72) Inventor: Xiaoping Yu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 349 days.

(21) Appl. No.: 16/973,791

(22) PCT Filed: Oct. 28, 2020

(86) PCT No.: PCT/CN2020/124245
§ 371 (c)(1),
(2) Date: Dec. 10, 2020

(87) PCT Pub. No.: WO2022/077560
PCT Pub. Date: Apr. 21, 2022

(65) Prior Publication Data
US 2022/0317491 A1   Oct. 6, 2022

(30) Foreign Application Priority Data
Oct. 16, 2020 (CN) .......................... 202011108115.4

(51) Int. Cl.
*G02F 1/1368* (2006.01)
*G02F 1/1362* (2006.01)
*G02F 1/1333* (2006.01)
*G02F 1/1343* (2006.01)

(52) U.S. Cl.
CPC ...... *G02F 1/1368* (2013.01); *G02F 1/133345* (2013.01); *G02F 1/134309* (2013.01); *G02F 1/136209* (2013.01); *G02F 1/136222* (2021.01); *G02F 2201/50* (2013.01)

(58) Field of Classification Search
CPC ............. G02F 1/1368; G02F 1/133345; G02F 1/134309; G02F 1/136222; G02F 2201/50
USPC ...................................... 349/42–46, 110–111
See application file for complete search history.

(56) References Cited

U.S. PATENT DOCUMENTS

| 9,202,855 B1 | 12/2015 | Jo et al. |
| 10,527,897 B2 | 1/2020 | Ishigaki et al. |
| 2015/0187800 A1* | 7/2015 | Park .................... H01L 27/1225 257/43 |
| 2016/0187688 A1 | 6/2016 | Wen |

(Continued)

FOREIGN PATENT DOCUMENTS

| CN | 103913882 | 7/2014 |
| CN | 104600079 | 5/2015 |

(Continued)

*Primary Examiner* — Charles S Chang

(57) ABSTRACT

The present invention provides an array substrate including a substrate, a transparent insulating layer, a light-absorbing layer, a thin film transistor layer, a first protective layer, and a color filter layer. Since structures of the transparent insulating layer and the light-absorbing layer are added to the array substrate, the problem of high reflectivity of display panels with light emitting from sides of the array substrate can be solved and the image quality of the display panel is improved, so that the display panel can better adapt to a full screen demand of the market.

20 Claims, 4 Drawing Sheets

(56) References Cited

U.S. PATENT DOCUMENTS

2019/0355763 A1 11/2019 Chen et al.
2021/0167156 A1 6/2021 Sun et al.

FOREIGN PATENT DOCUMENTS

| CN | 105374844 | 3/2016 |
| CN | 205485205 | 8/2016 |
| CN | 107885004 | 4/2018 |
| CN | 108089367 | 5/2018 |
| CN | 108535925 | 9/2018 |
| CN | 108573981 | 9/2018 |

* cited by examiner

ARRAY SUBSTRATE AND DISPLAY PANEL

RELATED APPLICATIONS

This application is a National Phase of PCT Patent Application No. PCT/CN2020/124245 having International filing date of Oct. 28, 2020, which claims the benefit of priority of Chinese Patent Application No. 202011108115.4 filed on Oct. 16, 2020. The contents of the above applications are all incorporated by reference as if fully set forth herein in their entirety.

FIELD AND BACKGROUND OF THE INVENTION

The present invention relates to a field of display technology, and in particular to an array substrate and a display panel.

Contrast is one of the important indexes for evaluating the image quality performance of a liquid crystal display (LCD). In real-use scenarios, the reflectivity of the display panel will affect the contrast of the image due to the influence of ambient light, as shown below:

$$\text{Ambient Contrast Ratio} = \frac{Lon + Lambient \cdot RL}{Loff + Lambient \cdot RL}$$

Lon/Loff respectively indicate the brightness of the display panel in a bright state/dark state, and $R_L$ indicates the reflectivity of the display panel. Therefore, contrast of the display panel can be improved from two aspects: 1. increase the brightness in bright state Lon of the display panel; 2. reduce the reflectance $R_L$ of the display panel.

At the same time, as market demand for borderless products grows, scheme with a thin film transistors (TFT) side facing outward is conducive to improving module yield of four-sided borderless products. However, metal in the TFT area is highly reflective, and the reflectivity of the light transmission area is also larger than color filter (CF) side facing outwards, resulting in a significant increase in the reflectivity of the display panel of ambient light, which will reduce the image quality of the display panel.

Therefore, it is necessary to reduce the reflectivity of the display panel to improve the image quality and display effect of the display panel.

SUMMARY OF THE INVENTION

The present invention provides an array substrate and a display panel, which can reduce the reflectivity of the display panel.

The present invention provides an array substrate, comprising:

a substrate, wherein the substrate comprises a first surface and a second surface opposite to each other;

a transparent insulating layer disposed on the first surface;

a light-absorbing layer disposed on a side of the transparent insulating layer away from the first surface, wherein the light-absorbing layer is defined with a plurality of through holes;

a thin film transistor layer disposed on a side of the light-absorbing layer away from the transparent insulating layer, wherein the thin film transistor layer is disposed corresponding to the light-absorbing layer;

a first protective layer disposed on a side of the light-absorbing layer and on a side of the thin film transistor layer away from the first surface; and a color filter layer disposed corresponding to the through holes and disposed on a side of the first protective layer away from the first surface.

In one exemplary embodiment, thin film transistor layer comprises a first metal layer, a gate insulating layer, and a second metal layer; the first metal layer is disposed corresponding to the light-absorbing layer and disposed on the side of the light-absorbing layer away from the transparent insulating layer; the gate insulating layer is disposed on a side of the first metal layer away from the first surface and extends to the transparent insulating layer; the second metal layer is disposed on a side of the gate insulating layer away from the first metal layer; and the second metal layer is disposed in an orthographic projection area of the first metal layer.

In one exemplary embodiment, the thin film transistor layer comprises a first metal layer, a gate insulating layer, and a second metal layer; the light-absorbing layer comprises a first light-absorbing layer and a second light-absorbing layer; the first light-absorbing layer is disposed on the side of the transparent insulating layer away from the first surface; the first metal layer is disposed corresponding to the first light-absorbing layer and disposed on a side of the first light-absorbing layer away from the first surface; the gate insulating layer is disposed on a side of the first metal layer away from the first surface and extends to the transparent insulating layer; the second light-absorbing layer is disposed on a side of the gate insulating layer away from the first metal layer; the second metal layer is disposed corresponding to the second light-absorbing layer; and the second metal layer is disposed on a side of the second light-absorbing layer away from the first surface.

In one exemplary embodiment, further comprising an insulating layer, wherein the thin film transistor layer comprises a first metal layer, a gate insulating layer, and a second metal layer; the light-absorbing layer comprises a sub-light-absorbing layer and a sub-metal layer; the sub-light-absorbing layer is disposed on the side of the transparent insulating layer away from the first surface; the sub-metal layer is disposed on a side of the sub-light-absorbing layer away from the transparent insulating layer; the insulating layer is disposed on a side of the sub-metal layer away from the first surface and extends to the transparent insulating layer; the first metal layer is disposed corresponding to the light absorbing layer and disposed on a side of the insulating layer away from the first surface; the gate insulating layer is disposed on a side of the first metal layer away from the first surface and extends to the transparent insulating layer; and the second metal layer is disposed corresponding to the light-absorbing layer and disposed on a side of the gate insulating layer away from the first metal layer.

In one exemplary embodiment, the sub-metal layer is made of a material comprising any one or a combination of copper, molybdenum, titanium, aluminum, nickel, niobium, thallium, or chromium.

In one exemplary embodiment, the light-absorbing layer is made of a material comprising metal oxide, metal nitride, metal oxynitride, or metal carbide.

In one exemplary embodiment, a thickness of the light-absorbing layer ranges from 40 nm to 120 nm, an absorption coefficient of the light-absorbing layer is equal to or less than 1, and a refractive index of the light-absorbing layer ranges from 1.4 to 3.

In one exemplary embodiment, a thickness of the transparent insulating layer ranges from 40 nm to 120 nm, an absorption coefficient of the transparent insulating layer is equal to or less than 0.2, and a refractive index of the transparent insulating layer ranges from 1.5 to 1.9.

In one exemplary embodiment, further comprising a second protective layer and a pixel electrode layer, wherein the second protective layer is disposed on a side of the color filter layer away from the first surface and extends to the first protective layer, and the pixel electrode layer is disposed corresponding to the color filter layer and disposed on the side of a second protective layer away from the color filter layer.

The present invention provides a display panel comprising an array substrate, wherein the array substrate comprising:

a substrate, wherein the substrate comprises a first surface and a second surface opposite to each other;

a transparent insulating layer disposed on the first surface;

a light-absorbing layer disposed on a side of the transparent insulating layer away from the first surface, wherein light-absorbing layer is defined with a plurality of through holes;

a thin film transistor layer disposed on a side of the light-absorbing layer away from the transparent insulating layer, wherein the thin film transistor layer is disposed corresponding to the light-absorbing layer;

a first protective layer disposed on a side of the light-absorbing layer and on a side of the thin film transistor layer away from the first surface; and a color filter layer disposed corresponding to the through hole, and disposed on a side of the first protective layer away from the first surface.

In one exemplary embodiment, the thin film transistor layer comprises a first metal layer, a gate insulating layer, and a second metal layer; the first metal layer is disposed corresponding to the light-absorbing layer and disposed on the side of the light-absorbing layer away from the transparent insulating layer; the gate insulating layer is disposed on a side of the first metal layer away from the first surface and extends to the transparent insulating layer; the second metal layer is disposed on a side of the gate insulating layer away from the first metal layer; and the second metal layer is disposed in an orthographic projection area of the first metal layer.

In one exemplary embodiment, the thin film transistor layer comprises a first metal layer, a gate insulating layer, and a second metal layer; the light-absorbing layer comprises a first light-absorbing layer and a second light-absorbing layer; the first light-absorbing layer is disposed on the side of the transparent insulating layer away from the first surface; the first metal layer is disposed corresponding to the first light-absorbing layer and disposed on a side of the first light-absorbing layer away from the first surface; the gate insulating layer is disposed on a side of the first metal layer away from the first surface and extends to the transparent insulating layer; the second light-absorbing layer is disposed on a side of the gate insulating layer away from the first metal layer; the second metal layer is disposed corresponding to the second light-absorbing layer; and the second metal layer is disposed on a side of the second light-absorbing layer away from the first surface.

In one exemplary embodiment, further comprising an insulating layer, wherein the thin film transistor layer comprises a first metal layer, a gate insulating layer, and a second metal layer; the light-absorbing layer comprises a sub-light-absorbing layer and a sub-metal layer; the sub-light-absorbing layer is disposed on the side of the transparent insulating layer away from the first surface; the sub-metal layer is disposed on a side of the sub-light-absorbing layer away from the transparent insulating layer; the insulating layer is disposed on a side of the sub-metal layer away from the first surface and extends to the transparent insulating layer; the first metal layer is disposed corresponding to the light absorbing layer and disposed on a side of the insulating layer away from the first surface; the gate insulating layer is disposed on a side of the first metal layer away from the first surface and extends to the transparent insulating layer; and the second metal layer is disposed corresponding to the light-absorbing layer and disposed on a side of the gate insulating layer away from the first metal layer.

In one exemplary embodiment, the sub-metal layer is made of a material comprising any one or a combination of copper, molybdenum, titanium, aluminum, nickel, niobium, thallium, or chromium.

In one exemplary embodiment, the light-absorbing layer is made of a material comprising metal oxide, metal nitride, metal oxynitride, or metal carbide.

In one exemplary embodiment, wherein a thickness of the light-absorbing layer ranges from 40 nm to 120 nm, an absorption coefficient of the light-absorbing layer is equal to or less than 1, and the refractive index of the light-absorbing layer ranges from 1.4 to 3.

In one exemplary embodiment, a thickness of the transparent insulating layer ranges from 40 nm to 120 nm, an absorption coefficient of the transparent insulating layer is equal to or less than 0.2, and a refractive index of the transparent insulating layer ranges from 1.5 to 1.9.

In one exemplary embodiment, further comprising a second protective layer and a pixel electrode layer, wherein the second protective layer is disposed on a side of the color filter layer away from the first surface and extends to the first protective layer, and the pixel electrode layer is disposed corresponding to the color filter layer and disposed on the side of a second protective layer away from the color filter layer.

In one exemplary embodiment, further comprising a color filter substrate and a liquid crystal layer, wherein the color filter substrate is disposed opposite to the array substrate, and the liquid crystal layer is disposed between the array substrate and the color filter substrate.

In one exemplary embodiment, the color filter substrate comprises a glass substrate, a common electrode layer, and a photoresist layer; the glass substrate is disposed opposite to the array substrate; the common electrode layer is disposed on a side of the glass substrate close to the array substrate; the photoresist layer is disposed on a side of the common electrode layer close to the array substrate; and the photoresist layer is disposed corresponding to the thin film transistor layer.

The present invention provides an array substrate comprises a substrate, a transparent insulating layer, a light-absorbing layer, a thin film transistor layer, a first protective layer and a color filter layer. The substrate comprises a first surface and a second surface opposed to each other. The transparent insulating layer is disposed on the first surface. The light-absorbing layer is disposed on a side of the transparent insulating layer away from the first surface, wherein the light-absorbing layer is provided with a plurality of through holes. The thin film transistor layer is disposed on a side of the light-absorbing layer away from the transparent insulating layer, wherein the thin film transistor layer is disposed corresponding to the light-absorbing layer. The first protective layer is disposed on the side of the light-absorbing layer and on a side of the thin film transistor layer away from the first surface. The color filter layer is disposed corresponding to the through hole and disposed on a side of the first protective layer away from the first surface. By disposing a light-absorbing layer in the array substrate, to improve the problem of high reflectivity in the area where the thin film transistor layer is located. Meanwhile, an entire surface of transparent insulating layer is disposed between the substrate and the light-absorbing layer. On the one hand, the transparent insulating layer can improve the reflectivity of the corresponding area of the color filter layer, on the other hand, it can enhance the adhesion between the light-absorbing layer and the substrate, so as to make the structure of the substrate array more stable. Since the structure of the transparent insulating layer and the light-absorbing layer is added to the array substrate, the problem of high reflectivity of display panel with light emitting from the side of array substrate can be solved, and enhance the image quality of the display panel, so that the display panel can better adapt to the full screen demand of the market.

BRIEF DESCRIPTION OF THE SEVERAL VIEWS OF THE DRAWINGS

In order to describe clearly the embodiment in the present invention, the following will introduce the drawings for the embodiment shortly. Obviously, the following description is only a few embodiments, for the common technical personnel in the field it is easy to acquire some other drawings without creative work.

DESCRIPTION OF SPECIFIC EMBODIMENTS OF THE INVENTION

Figure 1:
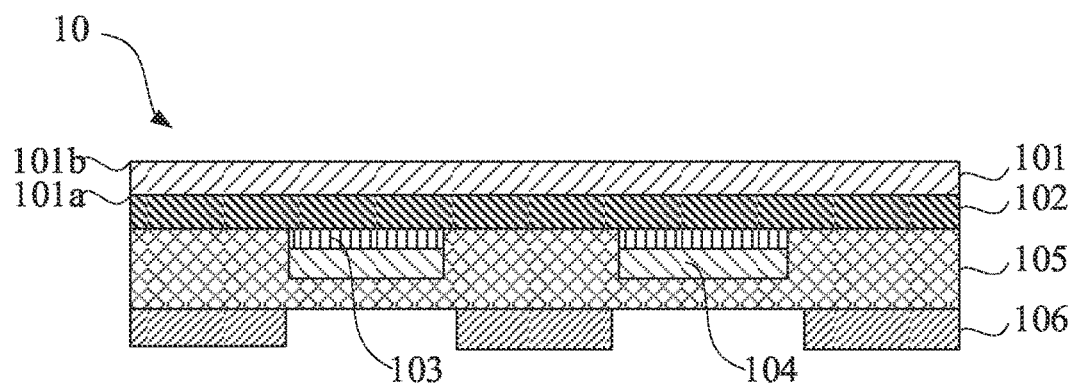
FIG. 1 is a first schematic structural diagram of the array substrate provided by the present invention.

The technical solutions of the present invention will be clearly and completely described below in conjunction with the accompanying drawings in the present invention. Obviously, the described embodiments are only a part of the embodiments of the present invention, rather than all the embodiments. Based on the embodiments of the present invention, all other embodiments obtained by those skilled in the art without creative work shall fall within the protection scope of the present invention.

It should be noted that in the description of the present invention, it should be understood that the terms "upper", "lower", "front", "back", "left", "right", "inside", "outside", etc. The indicated orientation or positional relationship is based on the orientation or positional relationship shown in the drawings, and is only for the convenience of describing the present invention and simplifying the description, rather than indicating or implying that the pointed device or element must have a specific orientation or a specific orientation. The structure and operation cannot therefore be understood as a limitation of the present invention.

The present invention provides an array substrate and a display panel. The array substrate will be described in detail below.

Figure 2:
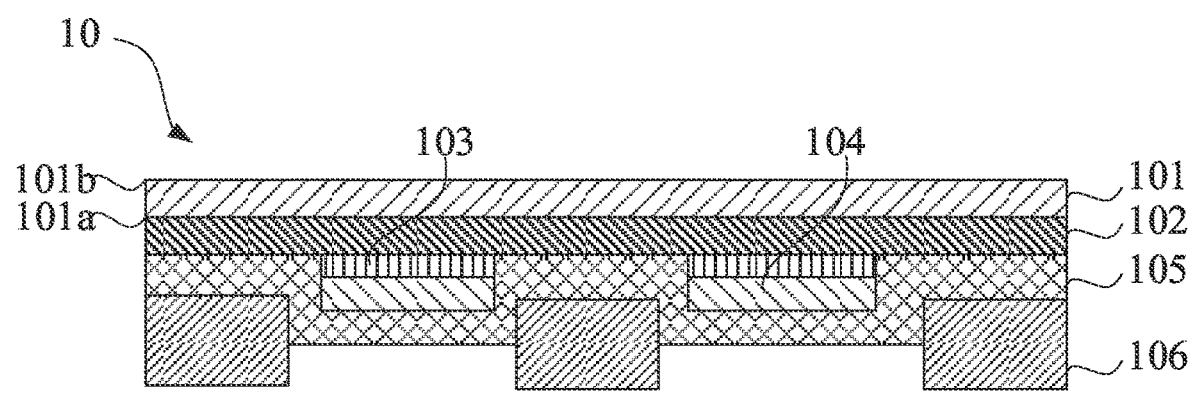
FIG. 2 is a second schematic structural diagram of the array substrate provided by the present invention.

Please refer to FIG. 1 and FIG. 2. FIG. 1 is a first schematic structural diagram of an array substrate 10 provided by the present invention. FIG. 2 is a second schematic structural diagram of an array substrate 10 provided by the present invention. The array substrate 10 comprises a substrate 101, a transparent insulating layer 102, a light-absorbing layer 103, a thin film transistor layer 104, a first protective layer 105, and a color filter layer 106. The substrate 101 comprises a first surface 101a and a second surface 101b disposed opposite to each other. The transparent insulating layer 102 is disposed on the first surface 101a. The light-absorbing layer 103 is disposed on a side of the transparent insulating layer 102 away from the first surface 101a, wherein the light-absorbing layer 103 is defined with a plurality of through holes. The thin film transistor layer 104 is disposed on a side of the light-absorbing layer 103 away from the transparent insulating layer 102, wherein the thin film transistor layer 104 is disposed corresponding to the light-absorbing layer 103. The first protective layer 105 is disposed on the side of the light-absorbing layer 103 and on a side of the thin film transistor layer 104 away from the first surface 101a. The color filter layer 106 is disposed corresponding to the through holes and disposed on a side of the first protective layer 105 away from the first surface 101a.

The present invention disposes the light-absorbing layer 103 in the array substrate 10 to solve the problem of high reflectivity in the area where the thin film transistor layer 104 is located. At the same time, a transparent insulating layer 102 is disposed on the entire surface between the substrate 101 and the light-absorbing layer 103. On the one hand, the transparent insulating layer 102 can alleviate the high reflectivity of a region corresponding to the color filter layer 106, and on the other hand, it can enhance adhesion between the light-absorbing layer 103 and the substrate 101, and make the structure of the array substrate 10 more stable. Since structures of the transparent insulating layer 102 and the light-absorbing layer 103 are added to the array substrate 10, the problem of high reflectivity of display panel with light emitting from sides of array substrate can be solved and image quality of the display panel is improved, so that the display panel can better adapt to a full screen demand of the market.

It should be noted that the first surface 101a can be the upper surface of the substrate 101, and the second surface 101b can be the lower surface of the substrate 101. Of course, the first surface 101a can also be the lower surface of the substrate 101, and the second surface 101b can be the upper surface of the substrate 101. Unless otherwise specified in the present invention, the default is that the first surface 101a is the lower surface of the substrate 101, and the second surface 101b is the upper surface of the substrate 101.

Wherein, FIG. 1 and FIG. 2 respectively show two disposition methods of the first protective layer 105. The first protective layer 105 is disposed to be planarized in the method of FIG. 1, which can facilitate the manufacture of subsequent film layers. The first protective layer 105 can be manufactured at once by evaporation in the method of FIG. 2, and this disposition can save material costs and manufacturing processes costs.

Wherein, the light-absorbing layer 103 is made of a material comprising metal oxide, metal nitride, metal oxynitride or metal carbide. Specifically, the chemical formula of the material used for the light-absorbing layer 103 is MoaXbOcNd, MoaXbWc, MoaXbCc or AlaObNc, wherein, a, c, and d are rational numbers greater than 0, b is a rational number equal to or more than 0, c and d are not 0 at the same time, and X is a metal element. Furthermore, X is any one of tantalum (Ta), vanadium (V), nickel (Ni), niobium (Nb), zirconium (Zr), tungsten (W), titanium (Ti), rhenium (Re), or hafnium (Hf).

Wherein, a thickness of the light-absorbing layer 103 ranges from 40 nm to 120 nm. Furthermore, a thickness of the light-absorbing layer 103 ranges from 50 nm to 90 nm. Wherein, an absorption coefficient of the light-absorbing layer 103 is equal to or less than 1, and a refractive index of the light-absorbing layer 103 ranges from 1.4 to 3. Specifically, the thickness of the light-absorbing layer 103 is 40 nm, 50 nm, 60 nm, 70 nm, 80 nm, 90 nm, 100 nm, 110 nm, or 120 nm. The absorption coefficient of the light-absorbing layer 103 is 0, 0.1, 0.2, 0.3, 0.4, 0.5, 0.6, 0.7, 0.8, 0.9, or 1. The refractive index of the light-absorbing layer 103 is 1.4, 1.5, 1.6, 1.7, 1.8, 1.9, 2, 2.1, 2.2, 2.3, 2.4, 2.5, 2.6, 2.7, 2.8, 2.9, or 3. Materials within the above parameter range are used for the manufacture of light-absorbing layer 103, which can better realize the effect of reducing reflectivity.

Wherein, the transparent insulating layer 102 is made of transparent insulation material. Specifically, silicon nitride or silicon oxynitride can be used. The transparent insulating layer 102 is disposed between the substrate 101 and the light-absorbing layer 103. On the one hand, the reflectivity of the array substrate 101 can be reduced, and on the other hand, adhesion between the light absorbing layer 103 and the substrate 101 can be improved. The transparent insulating layer 102 can be set up on an entire surface by chemical vapor deposition without additional yellow light process and etching process. It is easy to operate and the process is convenient.

Wherein, a thickness of the transparent insulating layer 102 ranges from 40 nm to 120 nm. Furthermore, the thickness of the transparent insulating layer 102 can range from 60 nm to 100 nm. Wherein, an absorption coefficient of the transparent insulating layer 102 is equal to or less than 0.2, a refractive index of the transparent insulating layer 102 ranges from 1.5 to 1.9. Specifically, the thickness of the transparent insulating layer 102 is 40 nm, 50 nm, 60 nm, 70 nm, 80 nm, 90 nm, 100 nm, 110 nm, or 120 nm. The absorption coefficient of the transparent insulating layer 102 is 0, 0.1, 0.15, 0.18, or 0.2. The refractive index of the transparent insulating layer 102 is 1.5, 1.6, 1.7, 1.8, or 1.9. Materials within the above parameter range are used for the manufacture of transparent insulating layer 102, which can better realize the effect of reducing reflectivity.

Figure 3:
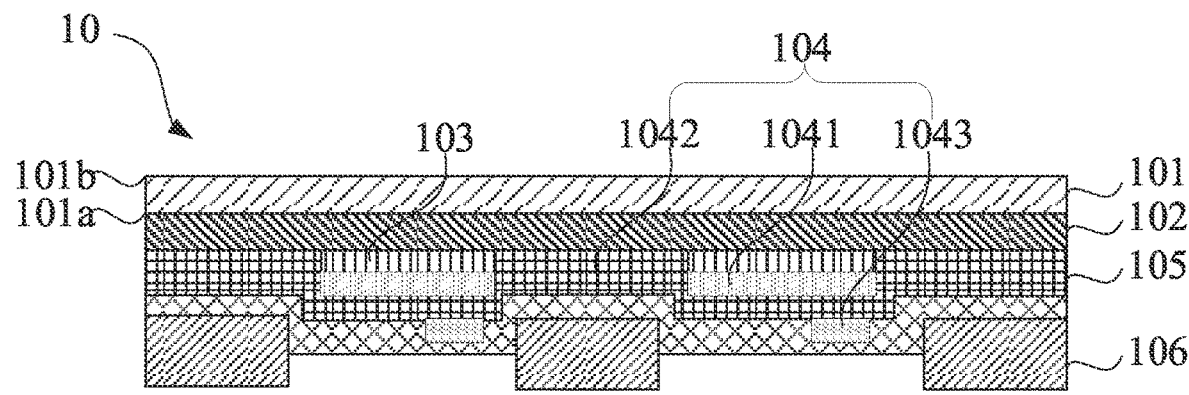
FIG. 3 is a third schematic structural diagram of the array substrate provided by the present invention.

Please refer to FIG. 3. FIG. 3 is the third schematic structural diagram of an array substrate 10 provided by the present invention. Wherein, the thin film transistor layer 104 comprises a first metal layer 1041, a gate insulating layer 1042, and a second metal layer 1043. The first metal layer 1041 is disposed corresponding to the light-absorbing layer 103 and disposed on the side of the light-absorbing layer 103 away from the transparent insulating layer 102, the gate insulating layer 1042 is disposed on a side of the first metal layer 1041 away from the first surface 101a and extends to the transparent insulating layer 102, the second metal layer 1043 is disposed on a side of the gate insulating layer 1042 away from the first metal layer 1041, and the second metal layer 1043 is disposed in an orthographic projection area of the first metal layer 1041.

In this embodiment, the light-absorbing layer 103 can cover the first metal layer 1041 and the second metal layer 1043 at the same time, and only one manufacturing process of the light-absorbing layer 103 is required, the process steps are simple and the equipment cost can be reduced. In addition, the thickness of the array substrate 10 will not be increased too much, and the lightness and thinness of the array substrate 10 can be maintained.

Figure 4:
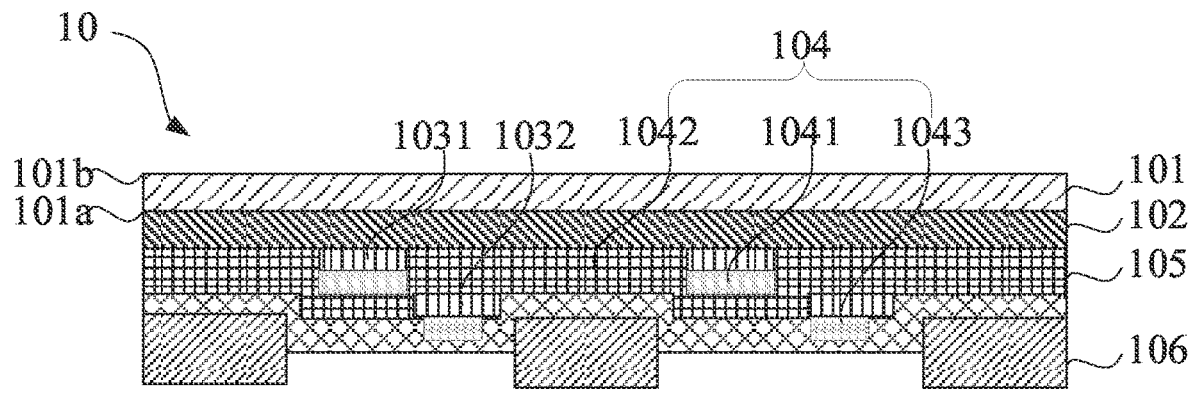
FIG. 4 is a fourth schematic structural diagram of the array substrate provided by the present invention.

Please refer to FIG. 4, FIG. 4 is the fourth schematic structural diagram of an array substrate 10 provided by the present invention. Wherein, the thin film transistor layer comprises a first metal layer 1041, a gate insulating layer 1042, and a second metal layer 1043. The light-absorbing layer 103 comprises a first light-absorbing layer 1031 and a second light-absorbing layer 1032. The first light-absorbing layer 1031 is disposed on the side of the transparent insulating layer 102 away from the first surface 101a, the first metal layer 1041 is disposed corresponding to the first light-absorbing layer 1031 and disposed on a side of the first light-absorbing layer 1031 away from the first surface 101a, the gate insulating layer 1042 is disposed on a side of the first metal layer 1041 away from the first surface 101a and extends to the transparent insulating layer 102, the second light-absorbing layer 1032 is disposed on a side of the gate insulating layer 1042 away from the first metal layer 1041, the second metal layer 1043 is disposed corresponding to the second light-absorbing layer 1032, and the second metal layer 1043 is disposed on a side of the second light-absorbing layer 1032 away from the first surface 101a.

In this embodiment, the light-absorbing layer 103 comprises a first light-absorbing layer 1031 and a second light-absorbing layer 1032, the first metal layer 1041 and the second metal layer 1043 are respectively disposed corresponding to the first light-absorbing layer 1031 and the second light-absorbing layer 1032. Due to possible deviation between the first metal layer 1041 and the second metal layer 1043, the second metal layer 1043 leaks out from an orthographic projection area where the light-absorbing layer 103 is located, affecting the effect of alleviating reflectivity of the light-absorbing layer. This disposition can prevent the second metal layer 1043 leaking from the orthographic projection area where the light absorbing layer 103 is located.

Figure 5:
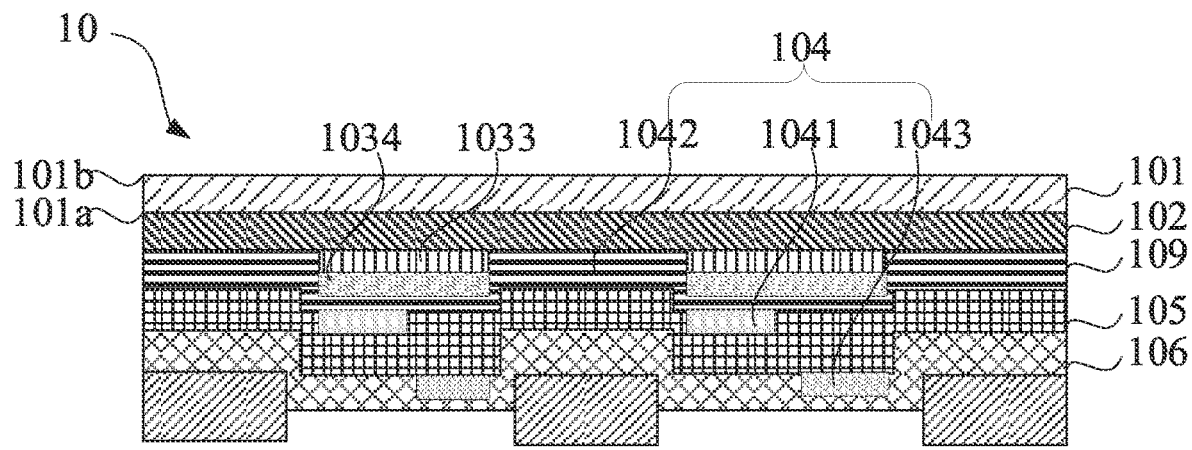
FIG. 5 is a fifth schematic structural diagram of the array substrate provided by the present invention.

Please refer to FIG. 5. FIG. 5 is the fourth schematic structural diagram of an array substrate 10 provided by the present invention, further comprising an insulating layer 109, wherein the thin film transistor layer 104 comprises a first metal layer 1041, a gate insulating layer 1042, and a second metal layer 1043. The light-absorbing layer 103 comprises a sub-light-absorbing layer 1033 and a sub-metal layer 1034, the sub-light-absorbing layer 1033 is disposed on the side of the transparent insulating layer 102 away from the first surface 101a, the sub-metal layer 1034 is disposed on a side of the sub-light-absorbing layer 1033 away from the transparent insulating layer 102, the insulating layer 109 is disposed on a side of the sub-metal layer 1034 away from the first surface 101a and extends to the transparent insulating layer 102, the first metal layer 1041 is disposed corresponding to the light absorbing layer 103 and disposed on a side of the insulating layer 109 away from the first surface 101a, the gate insulating layer 1042 is disposed on a side of the first metal layer 1041 away from the first surface 101a and extends to the transparent insulating layer 102, and the second metal layer 1043 is disposed corresponding to the light-absorbing layer 103 and disposed on a side of the gate insulating layer 1042 away from the first metal layer 1041.

Wherein, the sub-metal layer 1034 is made of a material comprising any one or a combination of copper (Cu), molybdenum (Mo), titanium (Ti), aluminum (Al), nickel (Ni), niobium (Nb), thallium (Ta), or chromium (Cr).

In this embodiment, since the light-absorbing layer 103 is made separately, i.e., it is not directly in contact with the first metal layer 1041 or the second metal layer 1042 in the thin film transistor layer 104, the effect of reducing reflectivity is not very ideal. It requires another composite setting of a sub-metal layer 1034 to reduce reflectivity. However, considering that another insulating layer 109 needs to be disposed, the thickness of the light-absorbing layer 103 is set to a smaller range to avoid affecting the thickness of the array substrate 10.

Figure 6:
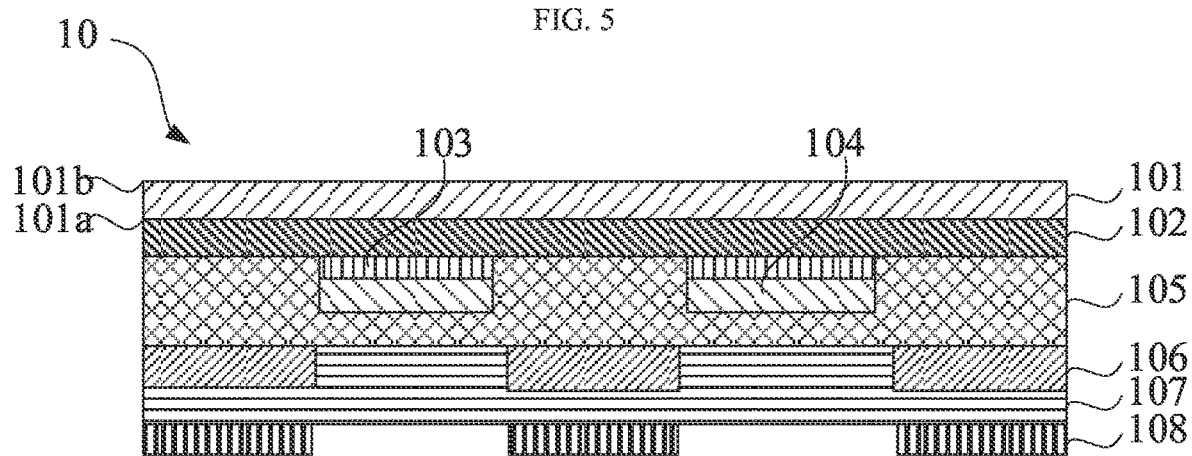
FIG. 6 is a sixth schematic structural diagram of the array substrate provided by the present invention.
Figure 7:
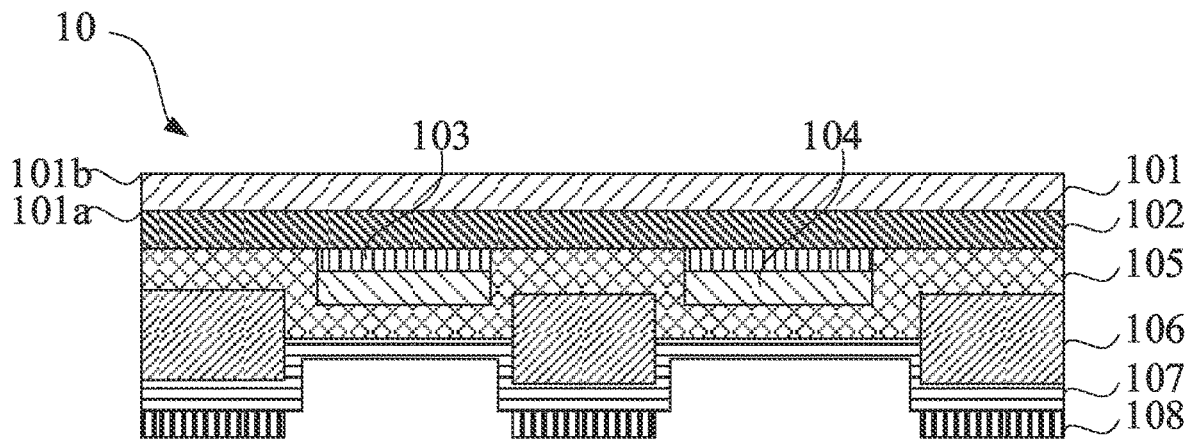
FIG. 7 is a seventh schematic structural diagram of the array substrate provided by the present invention.

Please refer to FIG. 6 and FIG. 7. FIG. 6 is the sixth schematic structural diagram the array substrate 10 provided by the present invention. FIG. 7 is the seventh schematic structural diagram of the array substrate 10 provided by the present invention. Wherein, the array substrate 10 further comprises a second protective layer 107 and a pixel electrode layer 108, wherein the second protective layer 107 is disposed on a side of the color filter layer 106 away from the first surface 101a and extends to the first protective layer 105, and the pixel electrode layer 108 is disposed corresponding to the color filter layer 106 and disposed on a side of the second protective layer 107 away from the color filter layer 106.

Figure 8:
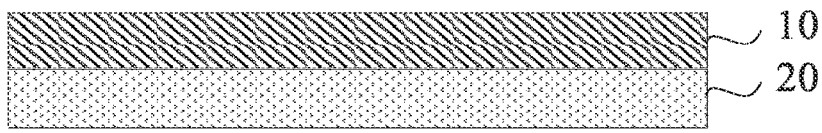
FIG. 8 is a first schematic structural diagram of the display panel provided by the present invention.

The present invention provides a display panel 100. FIG. 8 is the first schematic structural diagram of the display panel 100 provided by the present invention. Wherein, the display panel 100 comprises the array substrate 10 and the color filter substrate 20 described above, and the display panel 100 may also comprise other devices. The color filter substrate 20 and other devices and their assembly in the present invention are related technologies well known to those skilled in the art, and will not be repeated here.

The display panel 100 provided by the present invention uses an array substrate 10, by disposing a light absorption layer in the array substrate 10 to solve the problem of high reflectivity in the area where the thin film transistor layer 104 is located. At the same time, a transparent insulating layer 102 is disposed on the entire surface between the substrate 101 and the light-absorbing layer 103. On the one hand, the transparent insulating layer 102 can alleviate the high reflectivity of a region corresponding to the color filter layer 106, and on the other hand, it can enhance adhesion between the light-absorbing layer 103 and the substrate 101 and make the structure of the array substrate 10 more stable. Since the structure of the transparent insulating layer 102 and the light-absorbing layer 103 are added to the array substrate 10, the problem of high reflectivity of display panel with light emitting from sides of array substrate can be solved, and the image quality of the display panel is improved, so that the display panel can better adapt to a full screen demand of the market.

Figure 9:
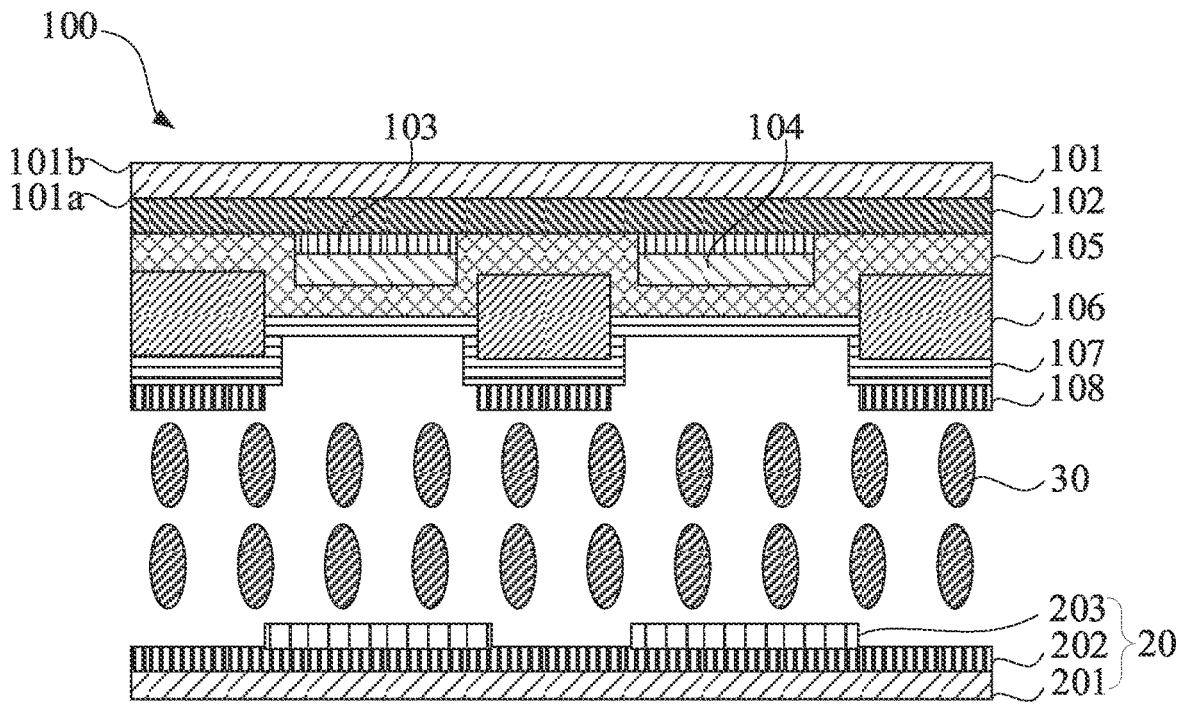
FIG. 9 is a second schematic structural diagram of the array substrate provided by the present invention.

Specifically, please refer to FIG. 9, FIG. 9 is the second schematic structural diagram of a display panel 100 provided by the present invention. Wherein, The display panel 100 comprises an array substrate 10, a color filter substrate 20, and a liquid crystal layer 30, wherein the color filter substrate 20 is disposed opposite to the array substrate 10, and the liquid crystal layer 30 is disposed between the array substrate 10 and the color filter substrate 20.

Wherein, the array substrate 10 is the above-mentioned array substrate 10. The color filter substrate 20 comprises a glass substrate 201, a common electrode layer 202, and a photoresist layer 203. The glass substrate 201 is disposed opposite to the array substrate 10, the common electrode layer 202 is disposed on a side of the glass substrate 201 close to the array substrate 10, the photoresist layer 203 is disposed on a side of the common electrode layer 202 close to the array substrate 10, and the photoresist layer 203 is disposed corresponding to the thin film transistor layer 104.

In this embodiment, it is illustrated that the array substrate 10 provided by the present invention is applied to a liquid crystal display, but in fact, the array substrate 10 provided by the present invention can also be applied for an OLED display panel or other display panels. Therefore, the embodiment shown in FIG. 9 is not intended to limit the present invention.

Figure 10:
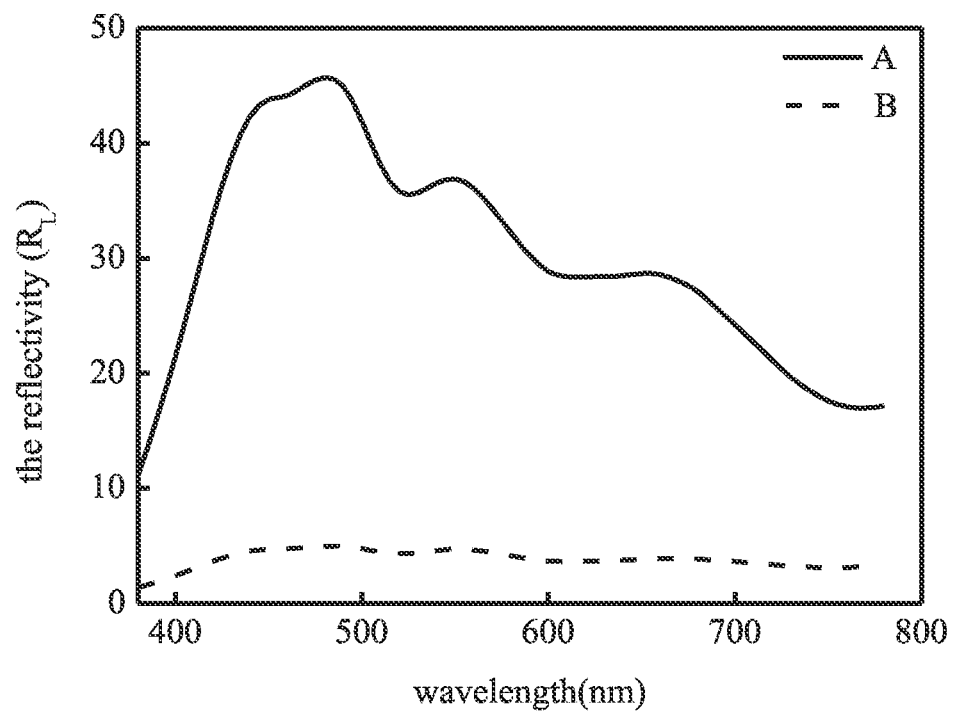
FIG. 10 is a reflectance spectrum of an area where a thin film transistor layer is located in the display panel provided by the present invention.
Figure 11:
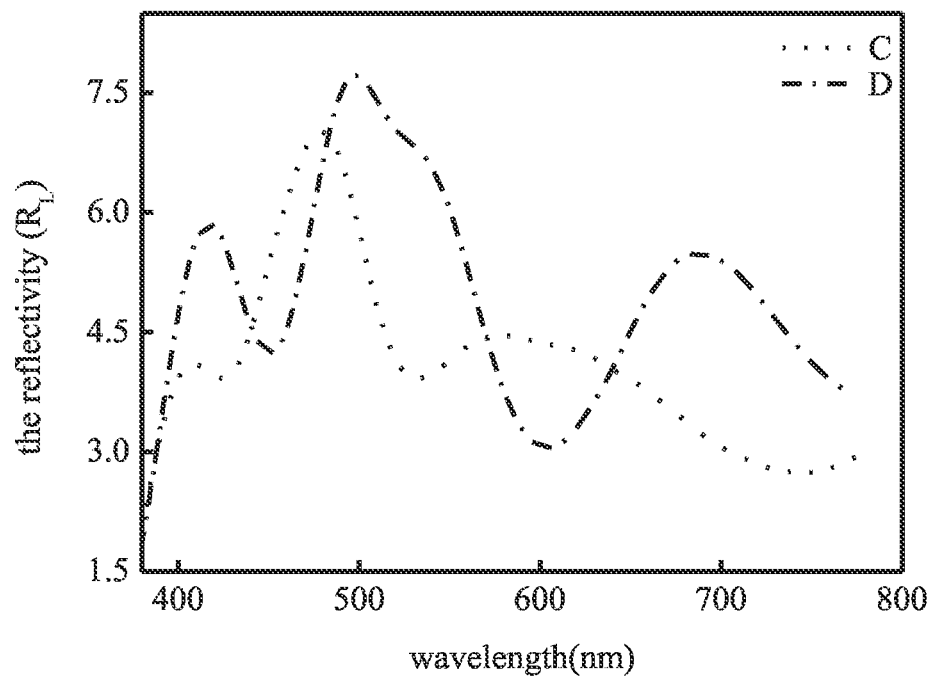
FIG. 11 is a reflectance spectrum of an area where a color film layer is located in the display panel provided by the present invention.

Please refer to FIG. 10 and FIG. 11, FIG. 10 is the reflectance spectrum of the area where the thin film transistor layer in the display panel is located provided by the present invention. The abscissa in FIG. 10 represents the wavelength of light in nanometers (nm). The ordinate represents the reflectivity ($R_L$), A is an array substrate without a light-absorbing layer and a transparent insulating layer, B is the array substrate provided by the present invention. FIG. 11 is the reflectance spectrum of the area where the color film layer in the display panel is located provided by the present invention. The abscissa in FIG. 10 represents the wavelength of light in nanometers (nm). The ordinate represents the reflectivity ($R_L$), C is the array substrate provided by the present invention, D is an array substrate without a light-absorbing layer and a transparent insulating layer. As can be seen from the results in FIG. 10 and FIG. 11, since the present invention is provided with a light-absorbing layer and a transparent insulating layer in the area where the thin film transistor layer is located, the reflectivity is reduced to less than 5% on average, the combined effect of light-absorbing layer and the transparent insulating layer to reduce the reflectivity is obvious. Moreover, it can be seen from the result of FIG. 11 that the array substrate structure of the present invention can also reduce the reflectivity of the area where the color filter layer is located to a certain extent. Therefore, disposing a light-absorbing layer and a transparent insulating layer in the array substrate can greatly reduce the reflectivity of the array substrate and improve the image quality of the display panel emitting light from the sides of the array substrate, so as to meet the needs of full-screen products.

The above provides a detailed introduction to the array substrate and the display panel provided by the present invention. Specific examples are used in this article to illustrate the principle and implementation of the present invention. The description of the above embodiments is only used to help understand the present invention. At the same time, for those skilled in the art, according to the idea of the present invention, there will be changes in the specific implementation and the scope of application. In summary, the content of this specification should not be construed as a limitation to the present invention.

What is claimed is:

1. An array substrate, comprising:
   a substrate, wherein the substrate comprises a first surface and a second surface disposed opposite to each other;

a transparent insulating layer disposed on the first surface;

a light-absorbing layer disposed on a side of the transparent insulating layer away from the first surface, wherein the light-absorbing layer is defined with a plurality of through holes;

a thin film transistor layer disposed on a side of the light-absorbing layer away from the transparent insulating layer, wherein the thin film transistor layer is disposed corresponding to the light-absorbing layer;

a first protective layer disposed on a side of the light-absorbing layer and on a side of the thin film transistor layer away from the first surface; and a color filter layer disposed corresponding to the through holes and disposed on a side of the first protective layer away from the first surface.

2. The array substrate according to claim 1, wherein the thin film transistor layer comprises a first metal layer, a gate insulating layer, and a second metal layer; the first metal layer is disposed corresponding to the light-absorbing layer and disposed on the side of the light-absorbing layer away from the transparent insulating layer; the gate insulating layer is disposed on a side of the first metal layer away from the first surface and extends to the transparent insulating layer; the second metal layer is disposed on a side of the gate insulating layer away from the first metal layer; and the second metal layer is disposed in an orthographic projection area of the first metal layer.

3. The array substrate according to claim 1, wherein the thin film transistor layer comprises a first metal layer, a gate insulating layer, and a second metal layer; the light-absorbing layer comprises a first light-absorbing layer and a second light-absorbing layer; the first light-absorbing layer is disposed on the side of the transparent insulating layer away from the first surface; the first metal layer is disposed corresponding to the first light-absorbing layer and disposed on a side of the first light-absorbing layer away from the first surface; the gate insulating layer is disposed on a side of the first metal layer away from the first surface and extends to the transparent insulating layer; the second light-absorbing layer is disposed on a side of the gate insulating layer away from the first metal layer; the second metal layer is disposed corresponding to the second light-absorbing layer; and the second metal layer is disposed on a side of the second light-absorbing layer away from the first surface.

4. The array substrate according to claim 1, further comprising an insulating layer, wherein the thin film transistor layer comprises a first metal layer, a gate insulating layer, and a second metal layer; the light-absorbing layer comprises a sub-light-absorbing layer and a sub-metal layer; the sub-light-absorbing layer is disposed on the side of the transparent insulating layer away from the first surface; the sub-metal layer is disposed on a side of the sub-light-absorbing layer away from the transparent insulating layer; the insulating layer is disposed on a side of the sub-metal layer away from the first surface and extends to the transparent insulating layer; the first metal layer is disposed corresponding to the light absorbing layer and disposed on a side of the insulating layer away from the first surface; the gate insulating layer is disposed on a side of the first metal layer away from the first surface and extends to the transparent insulating layer; and the second metal layer is disposed corresponding to the light-absorbing layer and disposed on a side of the gate insulating layer away from the first metal layer.

5. The array substrate according to claim 4, wherein the sub-metal layer is made of a material comprising any one or a combination of copper, molybdenum, titanium, aluminum, nickel, niobium, thallium, or chromium.

6. The array substrate according to claim 1, wherein the light-absorbing layer is made of a material comprising metal oxide, metal nitride, metal oxynitride, or metal carbide.

7. The array substrate according to claim 1, wherein a thickness of the light-absorbing layer ranges from 40 nm to 120 nm, an absorption coefficient of the light-absorbing layer is equal to or less than 1, and a refractive index of the light-absorbing layer ranges from 1.4 to 3.

8. The array substrate according to claim 1, wherein a thickness of the transparent insulating layer ranges from 40 nm to 120 nm, an absorption coefficient of the transparent insulating layer is equal to or less than 0.2, and a refractive index of the transparent insulating layer ranges from 1.5 to 1.9.

9. The array substrate according to claim 1, further comprising a second protective layer and a pixel electrode layer, wherein the second protective layer is disposed on a side of the color filter layer away from the first surface and extends to the first protective layer, and the pixel electrode layer is disposed corresponding to the color filter layer and disposed on the side of a second protective layer away from the color filter layer.

10. A display panel comprising an array substrate, wherein the array substrate comprises:
a substrate, wherein the substrate comprises a first surface and a second surface disposed opposite to each other;
a transparent insulating layer disposed on the first surface;
a light-absorbing layer disposed on a side of the transparent insulating layer away from the first surface, wherein light-absorbing layer is defined with a plurality of through holes;
a thin film transistor layer disposed on a side of the light-absorbing layer away from the transparent insulating layer, wherein the thin film transistor layer is disposed corresponding to the light-absorbing layer;
a first protective layer disposed on a side of the light-absorbing layer and on a side of the thin film transistor layer away from the first surface; and
a color filter layer disposed corresponding to the through holes and disposed on a side of the first protective layer away from the first surface.

11. The display panel according to claim 10, wherein the thin film transistor layer comprises a first metal layer, a gate insulating layer, and a second metal layer; the first metal layer is disposed corresponding to the light-absorbing layer and disposed on the side of the light-absorbing layer away from the transparent insulating layer; the gate insulating layer is disposed on a side of the first metal layer away from the first surface and extends to the transparent insulating layer; the second metal layer is disposed on a side of the gate insulating layer away from the first metal layer; and the second metal layer is disposed in an orthographic projection area of the first metal layer.

12. The display panel according to claim 10, wherein the thin film transistor layer comprises a first metal layer, a gate insulating layer, and a second metal layer; the light-absorbing layer comprises a first light-absorbing layer and a second light-absorbing layer; the first light-absorbing layer is disposed on the side of the transparent insulating layer away from the first surface; the first metal layer is disposed corresponding to the first light-absorbing layer and disposed on a side of the first light-absorbing layer away from the first surface; the gate insulating layer is disposed on a side of the first metal layer away from the first surface and extends to the transparent insulating layer; the second light-absorbing layer is disposed on a side of the gate insulating layer away from the first metal layer; the second metal layer is disposed corresponding to the second light-absorbing layer; and the second metal layer is disposed on a side of the second light-absorbing layer away from the first surface.

13. The display panel according to claim 10, further comprising an insulating layer, wherein the thin film transistor layer comprises a first metal layer, a gate insulating layer, and a second metal layer; the light-absorbing layer comprises a sub-light-absorbing layer and a sub-metal layer; the sub-light-absorbing layer is disposed on the side of the transparent insulating layer away from the first surface; the sub-metal layer is disposed on a side of the sub-light-absorbing layer away from the transparent insulating layer; the insulating layer is disposed on a side of the sub-metal layer away from the first surface and extends to the transparent insulating layer; the first metal layer is disposed corresponding to the light absorbing layer and disposed on a side of the insulating layer away from the first surface; the gate insulating layer is disposed on a side of the first metal layer away from the first surface and extends to the transparent insulating layer; and the second metal layer is disposed corresponding to the light-absorbing layer and disposed on a side of the gate insulating layer away from the first metal layer.

14. The display panel according to claim 13, wherein the sub-metal layer is made of a material comprising any one or a combination of copper, molybdenum, titanium, aluminum, nickel, niobium, thallium, or chromium.

15. The display panel according to claim 10, wherein the light-absorbing layer is made of a material comprising metal oxide, metal nitride, metal oxynitride, or metal carbide.

16. The display panel according to claim 10, wherein a thickness of the light-absorbing layer ranges from 40 nm to 120 nm, an absorption coefficient of the light-absorbing layer is equal to or less than 1, and the refractive index of the light-absorbing layer ranges from 1.4 to 3.

17. The display panel according to claim 10, wherein a thickness of the transparent insulating layer ranges from 40 nm to 120 nm, an absorption coefficient of the transparent insulating layer is equal to or less than 0.2, and a refractive index of the transparent insulating layer ranges from 1.5 to 1.9.

18. The display panel according to claim 10, further comprising a second protective layer and a pixel electrode layer, wherein the second protective layer is disposed on a side of the color filter layer away from the first surface and extends to the first protective layer, and the pixel electrode layer is disposed corresponding to the color filter layer and disposed on the side of a second protective layer away from the color filter layer.

19. The display panel according to claim 10, further comprising a color filter substrate and a liquid crystal layer, wherein the color filter substrate is disposed opposite to the array substrate, and the liquid crystal layer is disposed between the array substrate and the color filter substrate.

20. The display panel according to claim 19, wherein the color filter substrate comprises a glass substrate, a common electrode layer, and a photoresist layer; the glass substrate is disposed opposite to the array substrate; the common electrode layer is disposed on a side of the glass substrate close to the array substrate; the photoresist layer is disposed on a side of the common electrode layer close to the array substrate; and the photoresist layer is disposed corresponding to the thin film transistor layer.

* * * * *